J. WARNER.
Cultivator.
No. 6,167.
Patented Mar. 13, 1849.
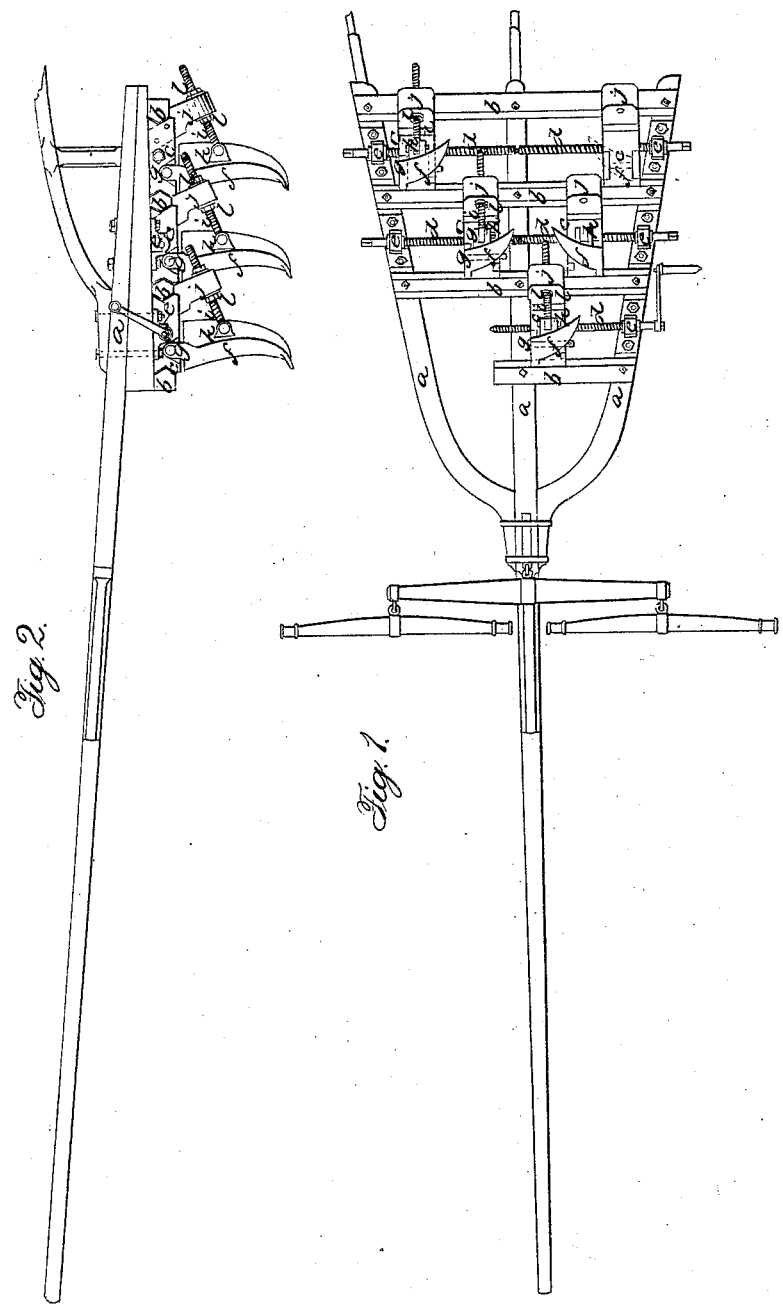

UNITED STATES PATENT OFFICE.

JEREMIAH WARNER, OF READING, PENNSYLVANIA.

IMPROVEMENT IN CULTIVATORS.

Specification forming part of Letters Patent No. 6,167, dated March 13, 1849.

*To all whom it may concern:*

Be it known that I, JEREMIAH WARNER, of Reading, in Berks county, and State of Pennsylvania, have invented certain new and useful Improvements in Cultivators; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is an inverted plan, and Fig. 2 a longitudinal vertical section.

The same letters indicate like parts in all the figures.

It is highly important to have the teeth of cultivators adjustable along the width of the frame, that all the teeth may be shifted in their relative positions to adapt the instrument to various kinds of cultivators; and it is also important to adjust the teeth so that the cutting-edge may be varied relatively to the line of draft, that the shares may tend to cut in more or less.

The nature of the first part of my invention relates to the mode of adjusting the teeth relatively to one another along the breadth of the frame; and it consists in attaching each tooth to a block that slides in ways in the frame, and provided with a screw, by the turning of which the position of the tooth may be adjusted with the greatest accuracy, and there held firmly in place.

And the second part of my invention, which relates to the adjustment of the cutting-edge so as to cut in more or less, consists in attaching the standard of each tooth by a hinge-joint at the upper end, in combination with a screw-brace jointed to the back of the standard and passing through a part of the frame with adjusting-nuts.

In the accompanying drawings, *a* represents a frame which, in its general form and structure, resembles cultivator-frames as usually made. To the under surface of this frame are attached four parallel bars, *b b b b*, placed at right angles with the line of draft. The inner edges of these bars constitute V-formed ways, to which are adapted five blocks, *c c c c c*, in which are tapped five screws, *d d d d d*, which are journaled and turn in appropriate boxes, *e*, secured to the under part of the frame, so that by the turning of these screws (by a winch-handle) the blocks can be moved from or toward the middle of the frame.

The upper end of the standards of the cultivator-teeth turn on fulcrum-pins *g*, attached to the sliding blocks *c*, so that by the turning of the screws the teeth are adjusted relatively to one another with the utmost accuracy, and there held by the force of the screws. The backs of the standards of the teeth are provided with ears *h*, to which are jointed by fulcrum-pins screw-braces *i*, which pass each through a stud, *j*, with a screw-nut, *l*, by the turning of which the inclination of the standards from a vertical line can be increased at pleasure to make the shares run more or less deep into the ground. Where there are two teeth in a line across the frame, one on each side of the draft-beam, two screws are used, one for each tooth, and the inner ends of which are let one into the other.

It will be obvious from the foregoing that the number of teeth may be increased or decreased at pleasure without changing the principles of my invention; that the slides may be variously formed, and that the screws, if desired, may be differently hung in the frame, and that, if desired, one single screw can be used to operate two of the teeth by making the screw with a right and left thread, running each from the middle toward one end; but in general it will be found advisable to adopt the mode first specified.

What I claim as my invention, and desire to secure by Letters Patent, is—

1. Connecting the teeth of cultivators to the frames thereof by attaching them to blocks adapted to slide in the frame, and provided with screws for regulating their position relatively to one another and to the draft-beam, substantially as described.

2. In combination with the foregoing, connecting the teeth by means of a hinge or other turning joint, and provided with the jointed screw-brace, the said joints and screw-braces being attached to the sliding blocks to which the teeth are attached, as described.

In witness whereof I have hereunto set my hand this 19th of September, 1848.

JEREMIAH WARNER.

In presence of—
W. F. FILBERT,
DAVID MEDARY.